US007933847B2

(12) United States Patent
Andrew et al.

(10) Patent No.: US 7,933,847 B2
(45) Date of Patent: Apr. 26, 2011

(54) LIMITED-MEMORY QUASI-NEWTON OPTIMIZATION ALGORITHM FOR L1-REGULARIZED OBJECTIVES

(75) Inventors: Galen Andrew, Redmond, WA (US); Jianfeng Gao, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 11/874,199

(22) Filed: Oct. 17, 2007

(65) Prior Publication Data

US 2009/0106173 A1    Apr. 23, 2009

(51) Int. Cl.
*G06F 15/18* (2006.01)
*G06F 17/27* (2006.01)
*G06N 3/08* (2006.01)
*G10L 15/14* (2006.01)
*G10L 15/00* (2006.01)
*G10L 15/18* (2006.01)

(52) U.S. Cl. ............... 706/12; 706/25; 704/9; 704/256; 704/257

(58) Field of Classification Search .................. None
See application file for complete search history.

(56) References Cited

U.S. PATENT DOCUMENTS

| 5,210,691 | A | 5/1993 | Freedman et al. |
| 7,010,486 | B2 | 3/2006 | Peters |
| 2005/0119885 | A1 | 6/2005 | Axelrod et al. |
| 2006/0074908 | A1 | 4/2006 | Selvaraj et al. |
| 2007/0011110 | A1 | 1/2007 | Selvaraj et al. |
| 2007/0094180 | A1 | 4/2007 | Rifkin et al. |
| 2007/0110292 | A1 | 5/2007 | Bi et al. |

OTHER PUBLICATIONS

Perkins, Simon et al.; "Grafting: Fast, Incremental Feature Selection by Gradient Descent in Function Space"; 2003; Journal of Machine Learning Research 3; pp. 1333-1356.*
Collins, Michael et al; "Discriminative Reranking for Natural Language Parsing"; 2005; MIT Press; Computational Linguistics vol. 31, Issue 1; pp. 25-70.*
Bertsekas, D.; "On the Goldstein-Levitin-Polyak gradient projection method"; Apr. 1976; IEEE Transactions on Automatic Control, vol. AC-21, No. 2; pp. 174-184.*
Gao, Jianfeng et al.; "A Comparative Study of Parameter Estimation Methods for Statistical Natural Language Processing"; Jun. 2007; Association for Computational Linguistics; pp. 824-831.*
Koh, Kwangmoo et al.; "An Efficient Method for Large-Scale L1-Regularized Convex Loss Minimization"; Jan. 2007; Proceedings IEEE Information Theory and Applications Workshop; pp. 1-8.*

(Continued)

*Primary Examiner* — Donald Sparks
*Assistant Examiner* — Stanley K Hill

(57) ABSTRACT

An algorithm that employs modified methods developed for optimizing differential functions but which can also handle the special non-differentiabilities that occur with the $L_1$-regularization. The algorithm is a modification of the L-BFGS (limited-memory Broyden-Fletcher-Goldfarb-Shanno) quasi-Newton algorithm, but which can now handle the discontinuity of the gradient using a procedure that chooses a search direction at each iteration and modifies the line search procedure. The algorithm includes an iterative optimization procedure where each iteration approximately minimizes the objective over a constrained region of the space on which the objective is differentiable (in the case of $L_1$-regularization, a given orthant), models the second-order behavior of the objective by considering the loss component alone, using a "line-search" at each iteration that projects search points back onto the chosen orthant, and determines when to stop the line search.

19 Claims, 8 Drawing Sheets

OTHER PUBLICATIONS

Figueiredo, Mario A. T.; "Gradient Projection for Sparse Reconstruction: Application to Compressed Sensing and Other Inverse Problems"; 2007; pp. 586-597.*

Schmidt; et al, "Fast Optimization Methods for L1Regularization: A Comparative Study and Two New Approaches", pp. 12.

LaLee; et al, "On the Implementation of an Algorithm for Large-Scale Equality Constrained Optimization", vol. 8, No. 3, 1998, Society for Industrial and Applied Mathematics, pp. 682-706.

Byrd; et al, "A Limited Memory Algorithm for Bound Constrained Optimization", 1994, pp. 25.

Vail; et al, "Feature Selection in Conditional Random Fields for Activity Recognition", pp. 7.

Koh et al.,"An Interior-Point Method for Large-Scale '1-Regularized Logistic Regression", 2007, Journal of Machine Learning Research 8 pp. 1519-1555.

* cited by examiner

```
                                    ┌─ 600
                            Algorithm OWL-QN choose initial point $x^0$
    $S \Leftarrow \{\}, Y \Leftarrow \{\}$
    for $k = 0$ to MaxIters do
        Compute $v^k = -\diamond f(x^k)$                    (1)
        Compute $d^k \Leftarrow H_k v^k$ using $S$ and $Y$
        $p^k \Leftarrow \pi(d^k; v^k)$                      (2)
        Find $x^{k+1}$ with constrained line search         (3)
        if termination condition satisfied then
            Stop and return $x^{k+1}$
        end if
        Update $S$ with $s^k = x^{k+1} - x^k$
        Update $Y$ with $y^k = \nabla \ell(x^{k+1}) - \nabla \ell(x^k)$  (4)
    end for
```

FIG. 6

LIMITED-MEMORY QUASI-NEWTON OPTIMIZATION ALGORITHM FOR L1-REGULARIZED OBJECTIVES

BACKGROUND

The rapid advances in hardware and software are the catalysts for tracking and storing large amounts of data. The commercial and economic benefits from gathering this data are clear; however, extracting useful information from now terabyte storage systems can be problematic.

Machine learning is becoming an integral part in many database systems that allow a computer to learn using computational and statistical methods. Log-linear models, including the special cases of Markov random fields and logistic regression, are used in a variety of forms in machine learning. The parameters of such models are typically trained to minimize an objective function. In order to achieve high generalization accuracy the parameters of a maximum-entropy classifier are regularized by optimizing an objective that is the sum of a loss term and a penalty term that favors lower-complexity models.

It is well-known that the use of regularization is necessary to achieve a model that generalizes well to unseen data, particularly if the number of parameters is very high relative to the amount of training data. One increasingly popular penalty function that is used is the $L_1$-norm of the parameters. The $L_1$-regularizer has the added benefit of producing "sparse" models, where most of the parameters are assigned the value zero, and can be removed from the model entirely.

The $L_1$-regularizer has several favorable properties compared to other regularizers, such as $L_2$. The $L_1$-regularizer has been proven conventionally to be capable of learning good models when most features are irrelevant.

This latter property of the $L_1$-regularizer is a consequence of the fact that the first partial derivative with respect to each variable is constant as the variable moves toward zero, "pushing" the value all the way to zero, if possible. The $L_2$-regularizer, by contrast, "pushes" a value less and less as it moves toward zero, producing parameters that are close, but not exactly, to zero. This fact about the $L_1$-regularizer also means that it is not differentiable at zero, and a gradient does not exist. Many algorithms for optimizing the objective depend on the existence of the gradient. Thus, it is more difficult to train such models than the more typical $L_2$-regularizer. However, the objective function cannot be minimized with general purpose gradient-based optimization algorithms such as the L-BFGS (limited-memory Broyden-Fletcher-Goldfarb-Shanno) quasi-Newton method, which has been shown to be superior at training large-scale $L_2$-regularized log-linear models.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed algorithm solves a conventional optimization problem that occurs when attempting to use the $L_1$-regularizer for maximum entropy models by presenting a parametric model having parameters that are determined by minimizing an objective function which includes the sum of a convex loss and the $L_1$ norm of the parameters. The novel algorithm uses modified methods developed for optimizing differential functions but which can also handle the special non-differentiability that occurs with the $L_1$-regularization.

The algorithm, referred to as the Orthant-Wise Limited-memory Quasi-Newton" algorithm (OWL-QN), is a modification of the L-BFGS (limited-memory Broyden-Fletcher-Goldfarb-Shanno) quasi-Newton algorithm, but which can now handle the discontinuity of the gradient using a procedure that chooses a search direction at each iteration and modifies the line search procedure.

More specifically, the algorithm globally minimizes the objective using an iterative optimization procedure where each iteration approximately minimizes the objective over a constrained region of space on which the objective is differentiable (in the case of $L_1$-regularization, a given orthant), models the second-order behavior of the objective by considering the loss component alone, uses a "line-search" at each iteration that projects search points back onto the chosen orthant, and uses a modified Armijo condition to determine when to stop the line search.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 6 illustrates a pseudo-code description of the disclosed algorithm.

DETAILED DESCRIPTION

Figure 1:
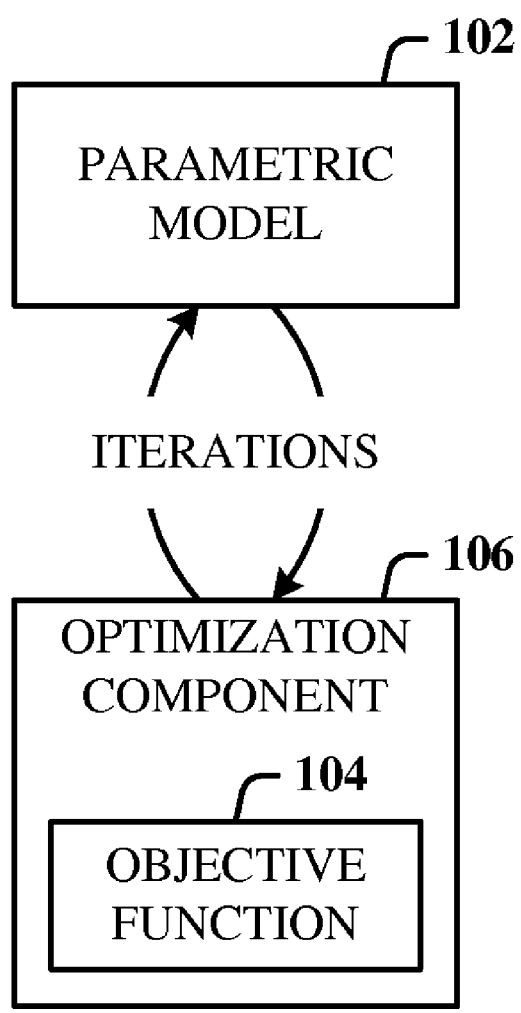
FIG. 1 illustrates a computer-implemented data processing system for log-linear models.

Maximum entropy models, including the special cases of Markov random fields and logistic regression, are used in a variety of forms in machine learning. The parameters of such models are typically trained to minimize an objective function, $$f(x)=l(x)+r(x), \tag{1}$$

where l is the negative log-probability of a labeled training set according to the model, and r is a regularization term that favors "simpler" models. It is well-known that the use of regularization is necessary to achieve a model that generalizes well to unseen data, particularly if the number of parameters is very high relative to the amount of training data.

A choice of regularizer that has received increasing attention is the weighted $L_1$-norm of the parameters, $$r(x) = C\|x\|_1 = C\sum_i |x_i| \qquad (1)$$

for some constant $C>0$. The $L_1$-regularizer has several favorable properties compared to other regularizers, such as $L_2$. It has been proven conventionally to be capable of learning good models when most features are irrelevant. The $L_1$-regularizer also typically produces sparse parameter vectors in which many of the parameters are exactly zero, which makes for models that are more interpretable and computationally manageable; however, the $L_1$-regularizer is not differentiable at zero for a parameter at zero and cannot be minimized with general gradient-based optimization algorithms.

Several special-purpose algorithms exist conventionally to overcome this difficulty: where variables are added one-at-a-time, each time re-optimizing the weights with respect to the current set of variables; expressing the objective as a constrained optimization problem for solving with a modification of generalized iterative scaling; and, a quasi-Newton algorithm for problems with bound constraints. However, conventional algorithms cannot handle large numbers (e.g., millions) of variables.

The disclosed architecture includes an algorithm, referred to as Orthant-Wise Limited-memory Quasi-Newton (OWL-QN), is based on L-BFGS (limited-memory Broyden-Fletcher-Goldfarb-Shanno) for training large-scale log-linear models using $L_1$ regularization. At each iteration, the algorithm computes a search direction by approximately minimizing a quadratic function that models the objective over an orthant containing the previous point. The OWL-QN algorithm can efficiently optimize the $L_1$-regularized log-likelihood of log-linear models with millions of parameters and scales up to very large problems.

The description describes how to implement the algorithm and applies the algorithm to the problem of natural language parsing with a log-linear re-ranking model. Note, however, that the technique can be applied to any machine learning method that trains parameters by optimizing a convex function.

Following are notations and definitions that will be used in the description. Given a convex function $f: \mathbb{R}^n \mapsto \mathbb{R}$ and vector $x \in \mathbb{R}^n$, let $\partial_i^+ f(x)$ denote the right partial derivative of $f$ at $x$ with respect to $x_i$:

$$\partial_i^+ f(x) = \lim_{\alpha \downarrow 0} \frac{f(x + \alpha e_i) - f(x)}{\alpha},$$

where $e_i$ is the $i^{th}$ standard basis vector, with the analogous left variant $\partial_i^- f(x)$.

The directional derivative of $f$ at $x$ in direction $d \in \mathbb{R}^n$ is denoted $f'(x; d)$, and is defined as $$f'(x, d) = \lim_{\alpha \downarrow 0} \frac{f(x + \alpha d) - f(x)}{\alpha},$$

A vector $d$ is referred to as a descent direction at $x$ if $f'(x; d) < 0$. The $L_2$ norm of a vector is represented as $\|\cdot\|$, unless explicitly written $\|\cdot\|_1$. Special functions will also be defined, for example, the sign function $\sigma$ takes values in $\{-1, 0, 1\}$ according to whether a real value is negative, zero, or positive. The function $\pi: \mathbb{R}^n \mapsto \mathbb{R}^n$ is parameterized by $y \in \mathbb{R}^n$, where $$\pi_i(x, y) = \begin{cases} x_i & \text{if } \sigma(x_i) = \sigma(y_i) \\ 0 & \text{otherwise} \end{cases}$$

and can be interpreted as the projection of $x$ onto an orthant defined by $y$.

The description of OWL-QN begins with a description of its parent, the L-BFGS quasi-Newton algorithm for unconstrained optimization of a smooth function.

Like Newton's method, quasi-Newton algorithms iteratively construct a local quadratic approximation to a function, and then conduct a line search in the direction of the point that minimizes the approximation. If $B_k$ is the (perhaps approximated) Hessian matrix of a smooth function $f$ at the point $x^k$, and $g^k$ is the gradient of $f$ at $x^k$, the function is locally modeled by, $$Q(x) = f(x^k) + (x - x^k)^\top g^k + \frac{1}{2}(x - x^k)^\top B_k (x - x^k). \qquad (2)$$

If $B_k$ is positive definite, the value $x^*$ that minimizes $Q$ can be computed analytically according to $$x^* = x^k - H_k g^k,$$

where $H_k = B_k^{-1}$. A quasi-Newton method then explores along the ray $x^k - \alpha H_k g^k$ for $\alpha \in (0, \infty)$ to obtain the next point $x^{k+1}$.

While pure Newton's method uses the exact second-order Taylor expansion at each point, quasi-Newton algorithms approximate the Hessian using first-order information gathered from previously explored points. L-BFGS, as a limited-memory quasi-Newton algorithm, maintains only curvature information from the most recent m points. Specifically, at step k, it records the displacement $s^k = x^k - x^{k-1}$ and the change in gradient $y^k = g^k - g^{k-1}$, discarding the corresponding vectors from iteration k−m. It then uses $\{s^i\}$ and $\{y^i\}$ to estimate $H_k$, or more precisely, to estimate the search direction $-H_k g^k$, since the full Hessian matrix (which may be unmanageably large) is not explicitly computed or inverted. The time and memory requirements of the computation are linear in the number of variables.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented data processing system 100 for log-linear models. The system 100 includes a parametric model 102 (e.g., log linear) having parameters that are determined by minimizing an objective function 104, which includes the sum of a convex loss and the $L_1$ norm of the parameters. The system 100 also includes an optimization component 106 for minimizing the objective function 104 over a whole region of space on which the objective function 104 is differentiable.

The optimization component 106 minimizes the objective function 104 iteratively, and employs $L_1$-regularization where the objective function 104 is linear. Each iteration of the procedure optimizes it approximately over a constrained region of the space. The objective function includes the sum of a convex loss and an $L_1$ norm of the parameters. The optimization component 106 performs a line search at each of multiple iterations that projects search points onto a selected orthant and the line search based on a decrease in function value relative to the directional derivative in the direction of actual movement. The optimization component 106 estimates a search direction using an inverse Hessian matrix (or curvature information) based on the loss alone. These and other aspects will be described in greater detail herein below.

Figure 2:
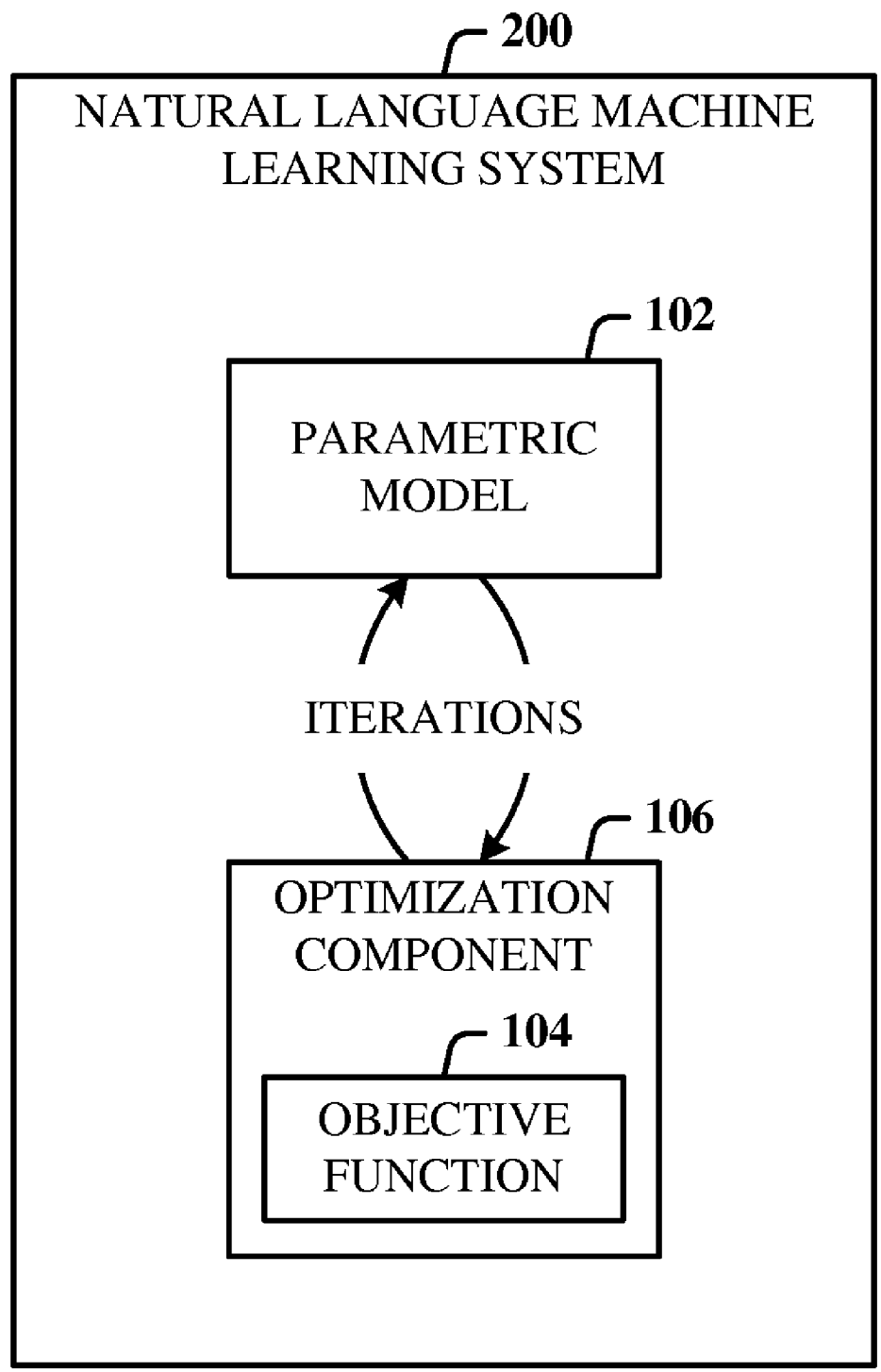
FIG. 2 illustrates the data process system for use in model training in a natural language machine learning system.

FIG. 2 illustrates the data process system 100 for use in model training in a natural language machine learning system 200. The regularization of the parameters in machine learning over a maximum-entropy classifier is commonly-used. However, the use of the system 100 in the machine learning system 200 on a parse re-ranking task, for example, exhibits speed approximating several orders of magnitude faster than conventional algorithms. The optimization component 106 trains the parameters of the parametric model 102 to minimize the objective function 104.

A classifier is a function that maps an input attribute vector, $x=(x_1, x_2, x_3, x_4, \ldots, x_n,$ where n is a positive integer), to a class label class(x). The classifier can also output a confidence that the input belongs to a class, that is, f(x)=confidence (class(x)). Such classification can employ a probabilistic and/ or other statistical analysis (e.g., one factoring into the analysis utilities and costs to maximize the expected value to one or more people) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, nayve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

Logistic regression is a specific type of log-linear model, which is class of machine learning model that can also employ the disclosed algorithm. In other words, the disclosed algorithm is applicable to other types of machine learning models (e.g. "least-squares" models), and potentially applicable to any case of minimizing a convex objective such that the space can be partitioned into differentiable regions, even if not differentiable on the boundaries between regions.

Figure 3:
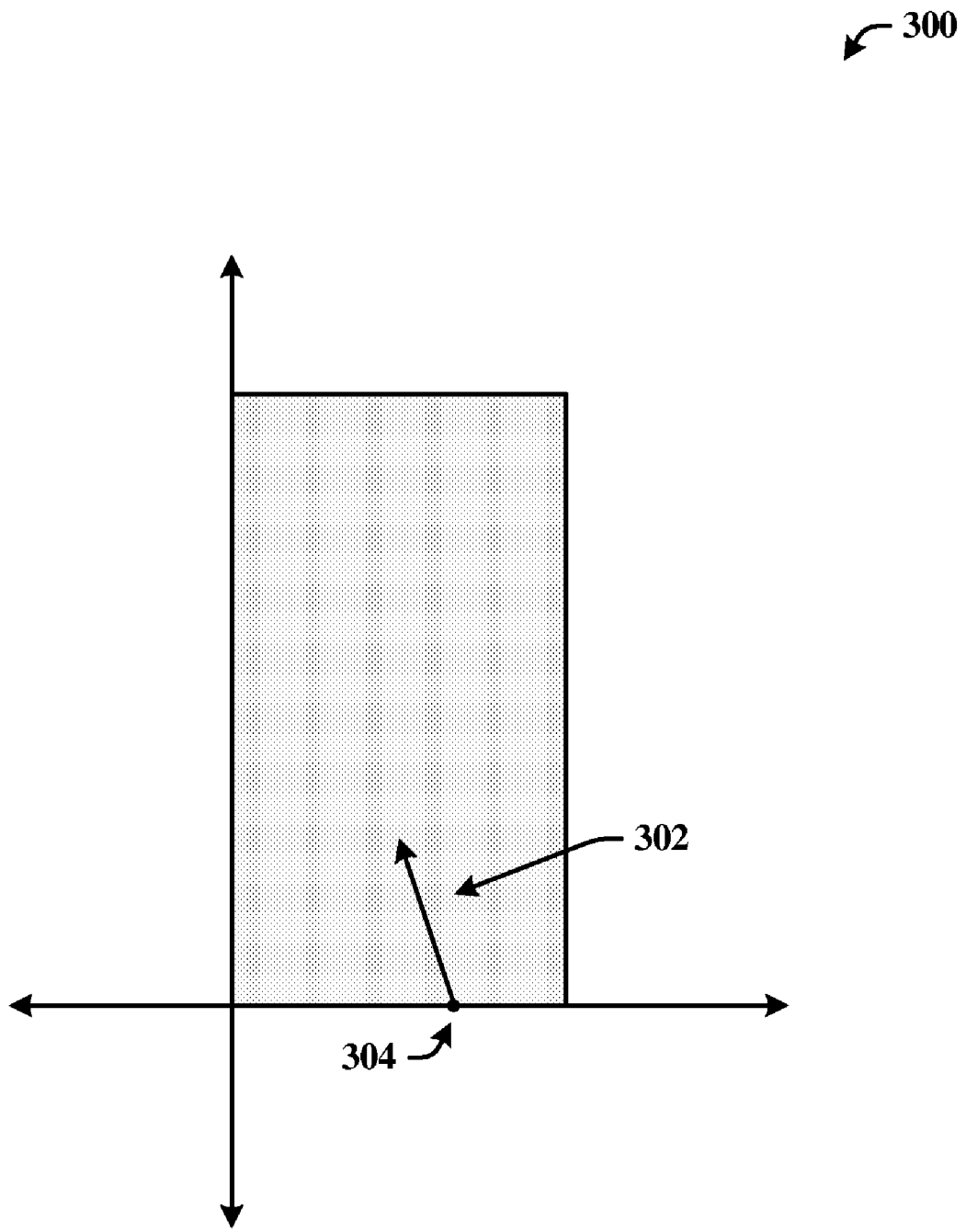
FIG. 3 illustrates a graph that depicts the selection of an orthant.

FIG. 3 illustrates a graph 300 that depicts the selection of an orthant 302. The orthant 302 is selected in which a current point 304 is located and in which direction the steepest descent points. In other words, computing the direction of the steepest descent given the gradient of the loss becomes straightforward.

Figure 4:
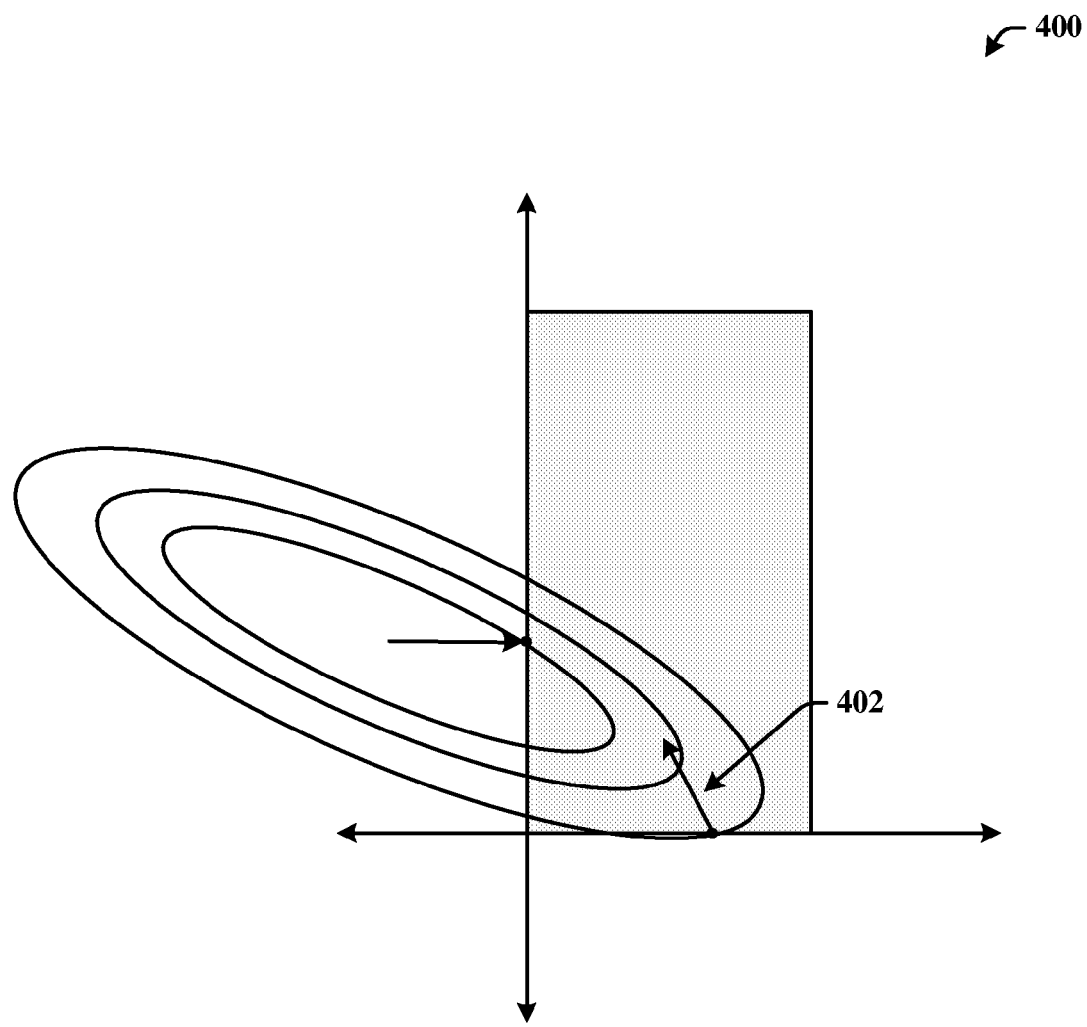
FIG. 4 illustrates a graph that for a single iteration of $L_1$-regularization based on an L-BFGS quasi-Newton method.

FIG. 4 illustrates a graph 400 that for a single iteration of $L_1$-regularization based on an L-BFGS quasi-Newton method. First, a vector 402 is found having the steepest descent. Next, the orthant is selected. An L-BFGS quadratic approximation is then found. A jump is then made to a minimum, followed by projection back on the orthant. The Hessian approximation is then updated using the gradient of loss, alone.

For the remaining description, assume that the loss function $l: \mathbb{R}^n \mapsto \mathbb{R}$ is convex, bounded below, continuously differentiable, and that the gradient $\nabla l$ is L-Lipschitz continuous on the set $\aleph = \{x: f(x) \leq f(x^0)\}$ for some L and some initial point $x^0$. An objective is to minimize $f(x)=l(x)+C\|x\|_1$ for a given constant C>0.

The disclosed algorithm is motivated by the following observation about the $L_1$ norm: when restricted to any given orthant (a set of points in which each coordinate never changes sign), it is differentiable, and in fact is a linear function of its argument. Hence the second-order behavior of the regularized objective $f$ on a given orthant is determined by the loss component alone. This consideration suggests the following strategy: construct a quadratic approximation that is valid for some orthant containing the current point using the inverse Hessian estimated from the loss component alone, then search in the direction of the minimum of the quadratic, restricting the search to the orthant on which the approximation is valid.

For any sign vector $\xi \in \{-1, 0, 1\}^n$, define $$\Omega_\xi = \{x \in \mathbb{R}^n : \pi(x; \xi)=x\},$$

which is the intersection of an orthant and a plane constraining some coordinates to be zero. For all x in $\Omega_\xi$ $$f(x)=l(x)+C\xi^T x.$$

Defining $f_\xi$ to be the extension of this function to all of $\mathbb{R}^n$, there exists a differentiable function that coincides with $f$ on $\Omega_\xi$. Using $H_k$, the L-BFGS approximation to the inverse Hessian of the loss, and $v^k$, the negative gradient of $f_\xi$ at $x^k$ projected onto the subspace containing $\Omega_\xi$ (this projection means that $v^k_i$ is set to zero whenever $\xi_i$ is zero) $f_\xi$ on $\Omega_\xi$ can be approximated with a quadratic function $Q_\xi$ as in (2), and search in the direction of the minimum of $Q_\xi$. For technical reasons, the search direction is constrained to match the sign pattern of $v^k$. This ensures that the line search does not deviate far from the direction of steepest descent, and is necessary to guarantee convergence.

$$p^k = \pi(H_k v^k; v^k). \tag{3}$$

There may be many orthants containing or adjacent to a given point, depending on how many of its coordinates are zero. In order to determine which orthant $\Omega_\xi$ to explore, define the pseudo-gradient of $f$ at x, denoted $\Diamond f(x)$, according to $$\Diamond_i f(x) = \begin{cases} \partial_i^- f(x) & \text{if } \partial_i^- f(x) > 0 \\ \partial_i^+ f(x) & \text{if } \partial_i^+ f(x) < 0 \\ 0 & \text{otherwise} \end{cases} \tag{4}$$

where the left and right partial derivatives of $f$ are $$\partial_i^\pm f(x) = \frac{\partial}{\partial x_i} \ell(x) + \begin{cases} C\sigma(x_i) & \text{if } x_i \neq 0 \\ \pm C & \text{if } x_i = 0 \end{cases}$$

Note that $\partial_i^- f(x) \leq \partial_i^+ f(x)$, so $\Diamond$ is well-defined. The pseudo-gradient generalizes the gradient in that the directional derivative at x is minimized (the local rate of decrease is maximized) in the direction of $-\diamond f(x)$, and x is a local minimum if and only if $\diamond f(x)=0$.

A reasonable choice of orthant to explore is the one containing $x^k$ and into which $-\diamond f(x^k)$ leads:

$$\xi_i^k = \begin{cases} \sigma(x_i^k) & \text{if } x_i^k \neq 0 \\ \sigma(-\diamond_i f(x^k)) & \text{if } x_i^k = 0 \end{cases}$$

A consequence of this choice is that $-\diamond f(x^k)$ is equal to $v^k$, the projection of the negative gradient of $f_\xi$ at $x^k$ onto the subspace containing $\Omega_\xi$. Thus, it is not necessary to determine $\xi^k$ explicitly; one merely computes $-\diamond f(x^k)$, and this is what is multiplied by $H_k$ in (3).

During the line search, in order to ensure that the region is not left on which $Q_\xi$ is valid, each point explored orthogonally is projected back onto $\Omega_\xi$, that is, explore points $$x^{k+1} = \pi(x^k + \alpha p^k; \xi^k),$$

which amounts to setting to zero any coordinate that moves from positive to negative, or vice-versa. Any number of methods can be used to choose $\alpha$, but the following variation of backtracking line search is used. Choose constants $\beta, \gamma \in (0, 1)$ and for $n=0, 1, 2, \ldots$, except the first step size $\alpha = \beta^n$ such that $$f(x^{k+1}) \leq f(x^k) - \gamma v^T (x^{k+1} - x^k).$$

A pseudo-code description of OWL-QN is given in the following Algorithm 1.

---

Algorithm 1 - OWL-QN choose initial point $x^0$
$S \Leftarrow \{\}, Y \Leftarrow \{\}$
for $k = 0$ to MaxIters do
    Compute $v^k = -\diamond f(x^k)$     (1)
    Compute $d^k \Leftarrow H_k v^k$ using S and Y
Microsoft Corporation
    $p^k \Leftarrow \pi(d^k; v^k)$     (2)
    Find $x^{k+1}$ with constrained line search     (3)
    if termination condition satisfied then
        Stop and return $x^{k+1}$
    end if
    Update S with $s^k = x^{k+1} - x^k$
    Update Y with $y^k = \nabla l(x^{k+1}) - \nabla l(x^k)$     (4)
end for

---

The differences from the L-BFGS algorithm have been delineated as follows:

1. The pseudo-gradient of $\diamond f(x^k)$ the regularized objective is used in place of the gradient.

2. The resulting search direction is constrained to match the sign pattern of $v^k = -\diamond f(x^k)$. This is the projection step of Equation (3).

3. During the line search, each search point is projected onto the orthant of the previous point.

4. The gradient of the unregularized loss alone is used to construct the vectors $y^k$ used to approximate the inverse Hessian.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 5:
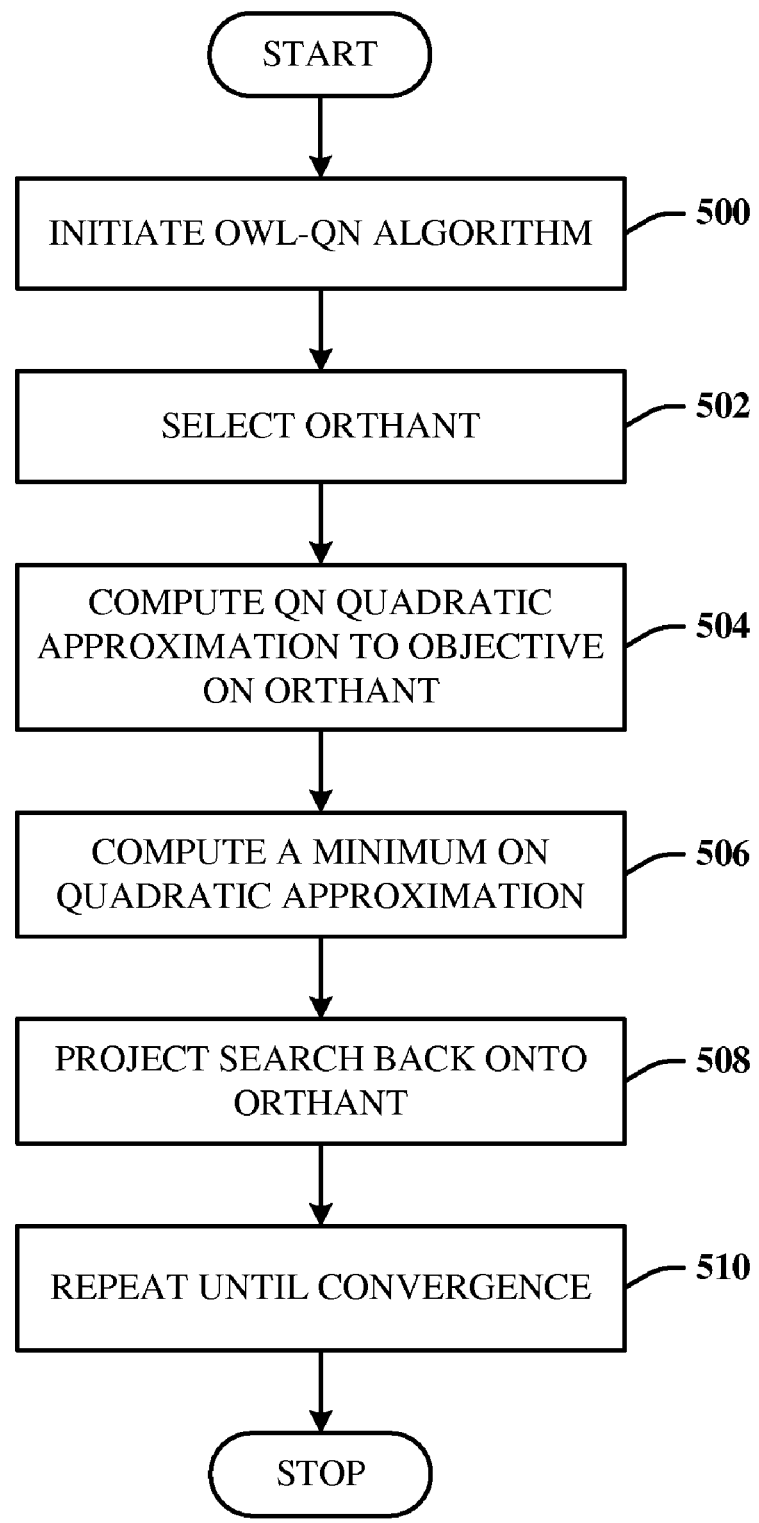
FIG. 5 illustrates a method of processing data for log-linear models.

FIG. 5 illustrates a method of processing data for a parametric model. At 500, an OWL-QN algorithm is initiated. At 502, an orthant is selected. At 504, a quasi-Newton quadratic approximation is computed to objective on the orthant. At 506, a minimum on the quadratic approximation is computed. At 508, a search is projected back to the orthant. At 510, the steps are repeated until convergence.

FIG. 6 illustrates a pseudo-code description of the disclosed algorithm 600.

Figure 7:
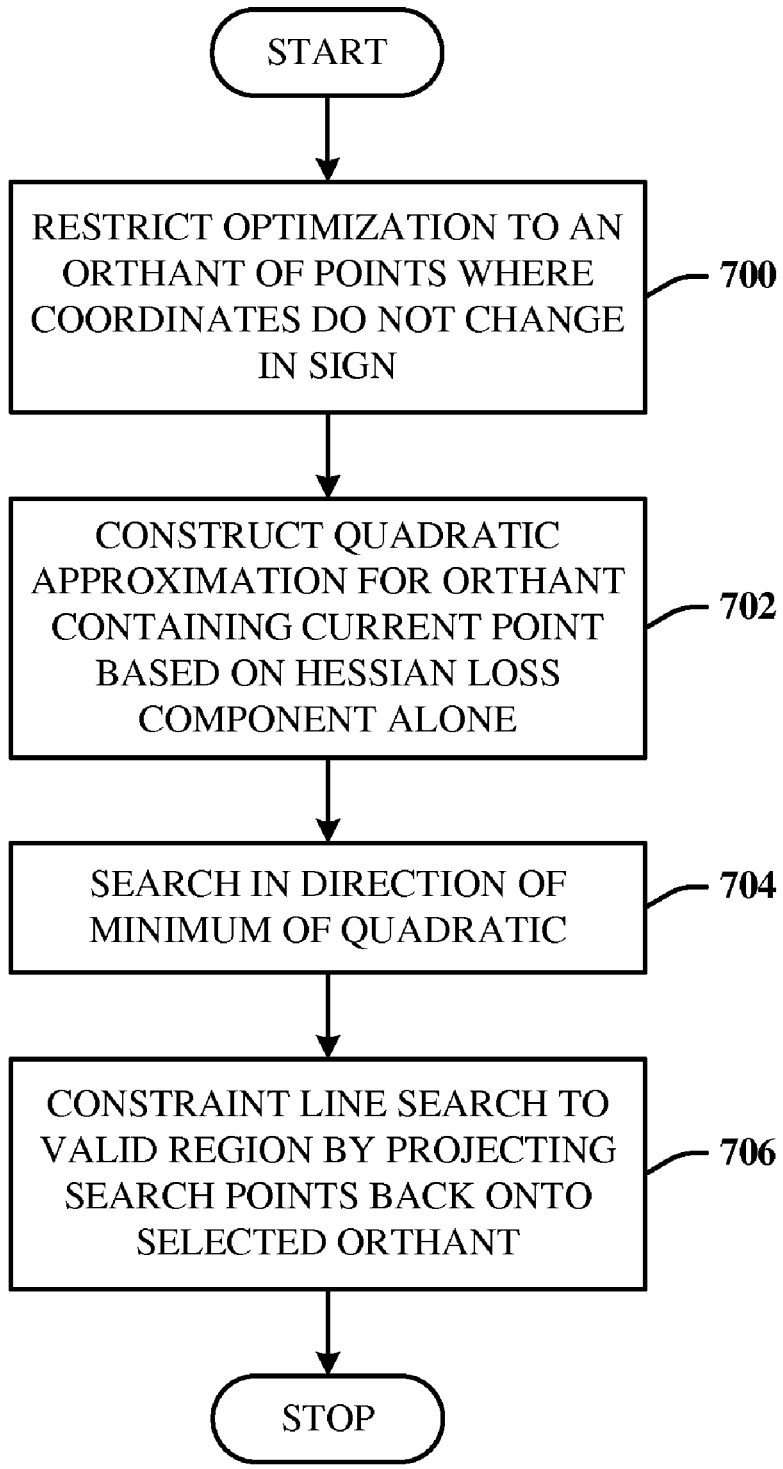
FIG. 7 illustrates a method of processing data in accordance with the disclosed algorithm.

FIG. 7 illustrates a method of processing data in accordance with the disclosed algorithm. At 700, optimization is restricted to an orthant of points where coordinates do not change in sign. At 702, a quadratic approximation for the orthant containing a current point is constructed based on the Hessian of the loss component alone. At 704, the search is in the direction of the minimum of the quadratic approximation. At 706, the line search is constrained to a region where the approximation is valid by projecting the search points back onto the selected orthant.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
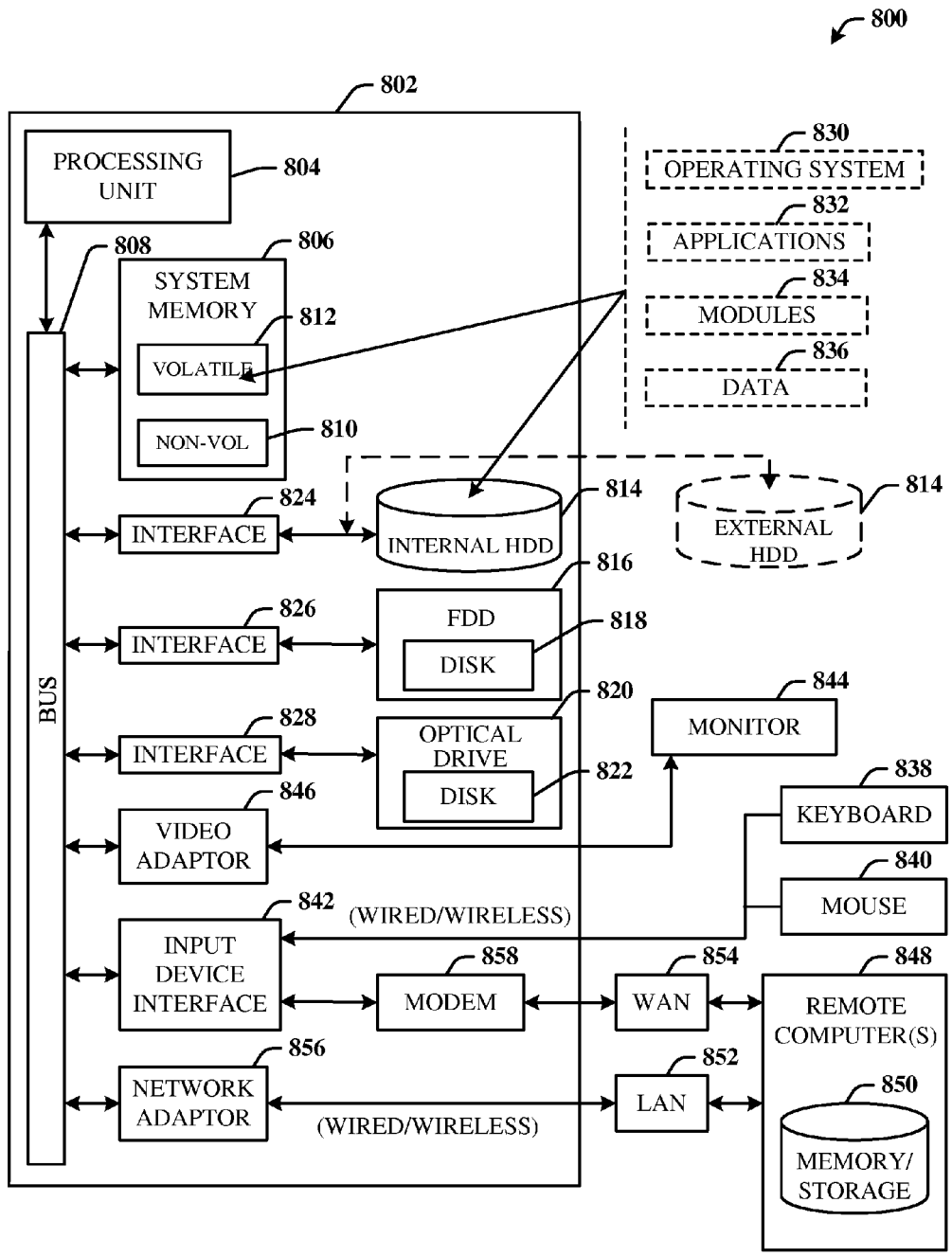
FIG. 8 illustrates a block diagram of a computing system operable to execute the disclosed log-linear optimization architecture.

Referring now to FIG. 8, there is illustrated a block diagram of a computing system 800 operable to execute the disclosed log-linear optimization architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802 having a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 can include non-volatile memory (NON-VOL) 810 and/or volatile memory 812 (e.g., random access memory (RAM)). A basic input/output system (BIOS) can be stored in the non-volatile memory 810 (e.g., ROM, EPROM, EEPROM, etc.), which BIOS stores the basic routines that help to transfer information between elements within the computer 802, such as during start-up. The volatile memory 812 can also include a high-speed RAM such as static RAM for caching data.

The computer 802 further includes an internal hard disk drive (HDD) 814 (e.g., EIDE, SATA), which internal HDD 814 may also be configured for external use in a suitable chassis, a magnetic floppy disk drive (FDD) 816, (e.g., to read from or write to a removable diskette 818) and an optical disk drive 820, (e.g., reading a CD-ROM disk 822 or, to read from or write to other high capacity optical media such as a DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 812, including an operating system 830, one or more application programs 832, other program modules 834, and program data 836. The one or more application programs 832, other program modules 834, and program data 836 can include the parametric model 102, the optimization component 106, and natural language machine learning system 200, for example.

All or portions of the operating system, applications, modules, and/or data can also be cached in the volatile memory 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, etc.

A monitor 844 or other type of display device is also connected to the system bus 808 via an interface, such as a video adaptor 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data processing system, comprising:
    a parametric model having parameters that are determined by minimizing an objective function which includes a sum of a convex loss and an $L_1$ norm of the parameters; and
    an optimization component for finding a parameter vector that globally minimizes the objective function for a plurality of iterations over an orthant on which the objective function is differentiable such that, at each iteration, a search direction is computed by approximately minimizing a quadratic function that models the objective function over the orthant containing a previous point and by using curvature information based on the convex loss alone; and
    a processor that executes computer-executable instructions associated with at least one of the parametric model or the optimization component.

2. The system of claim 1, wherein the optimization component trains the parameters of the parametric model, which is a machine learning model, to minimize the objective function.

3. The system of claim 1, wherein the parametric model is associated with natural language processing.

4. The system of claim 1, wherein the optimization component performs a line search at each of multiple iterations that projects search points onto a selected orthant.

5. The system of claim 1, wherein the optimization component stops a line search based on a decrease in function value relative to a directional derivative in a direction of actual movement.

6. The system of claim 1, wherein the optimization component optimizes the objective function approximately over a constrained region of space for each iteration.

7. The system of claim 1, wherein the quadratic function comprises a limited-memory Broyden-Fletcher-Goldfarb-Shanno (L-BFGS) quadratic function.

8. A computer-implemented method of processing a parametric model, comprising acts of:
    selecting an orthant that includes a current point in which direction a parametric vector representing steepest descent is pointed;
    computing a limited-memory Broyden-Fletcher-Goldfarb-Shanno (L-BFGS) quadratic approximation that is valid for the orthant;
    computing a minimum of the L-BFGS quadratic approximation;
    restricting a search to the orthant; and
    utilizing a processor that executes instructions stored in memory to perform at least one of the acts of selecting, computing, or restricting.

9. The method of claim 8, further comprising iteratively selecting the orthant, computing the L-BFGS quadratic approximation, computing a minimum of the L-BFGS quadratic approximation and restricting the search until convergence.

10. The method of claim 8, further comprising computing the L-BFGS quadratic approximation using an inverse Hessian matrix.

11. The method of claim 10, further comprising estimating the Hessian matrix based on the loss component alone.

12. The method of claim 8, further comprising searching in a direction in which the L-BFGS quadratic approximation is a minimum.

13. The method of claim 8, further comprising projecting search points back onto the selected orthant.

14. The method of claim 8, further comprising stopping the search, which is a line search, based on a decrease in function value relative to a direction of actual movement.

15. The method of claim 8, further comprising minimizing the quadratic approximation over a constrained region of space that is differentiable.

16. A computer-implemented method of processing a parametric model, comprising acts of:
    selecting an orthant having a set of points of a sign pattern;
    minimizing a convex function over the orthant;
    modeling second-order behavior of the convex function based on a loss component;
    constraining a search direction to match the sign pattern of the set of points;
    projecting each search point back to the orthant; and
    utilizing a processor that executes instructions stored in memory to perform at least one of the acts of selecting, minimizing, modeling, constraining, or projecting.

17. The method of claim 16, further comprising employing a pseudo gradient of the convex function.

18. The method of claim 16, further comprising finding a vector of steepest descent.

19. The method of claim 18, further comprising selecting the orthant based on the vector.

* * * * *